(12) United States Patent
Hamalainen et al.

(10) Patent No.: US 9,804,005 B2
(45) Date of Patent: Oct. 31, 2017

(54) INDICATING DEVICE AND POINTER FOR THE SAME

(71) Applicants: DENSO International America, Inc., Southfield, MI (US); DENSO CORPORATION, Kariya, Aichi-pref. (JP)

(72) Inventors: Evan Hamalainen, Taylor, MI (US); Joseph Falzon, Livonia, MI (US)

(73) Assignees: DENSO International America, Inc., Southfield, MI (US); DENSO CORPORATION, Southfield, MI (US)

( * ) Notice: Subject to any disclaimer, the term of this patent is extended or adjusted under 35 U.S.C. 154(b) by 205 days.

(21) Appl. No.: 14/631,145

(22) Filed: Feb. 25, 2015

(65) Prior Publication Data

US 2016/0245675 A1 Aug. 25, 2016

(51) Int. Cl.
*G01D 13/26* (2006.01)
*G01D 13/02* (2006.01)
*G01D 11/28* (2006.01)

(52) U.S. Cl.
CPC ........... *G01D 13/265* (2013.01); *G01D 11/28* (2013.01); *G01D 13/02* (2013.01)

(58) Field of Classification Search
CPC ........ G01D 13/00; G01D 13/22; G01D 13/26; G01D 13/265; G01D 11/28; B60K 35/00; B60K 37/02
USPC ............ 116/286, 287, 288, DIG. 6, DIG. 36; 362/23.12, 23.13, 23.19, 23.2, 23.21
See application file for complete search history.

(56) References Cited

U.S. PATENT DOCUMENTS

| | | | | |
|---|---|---|---|---|
| 5,983,827 A | * | 11/1999 | Cookingham et al. | G01D 11/28 116/288 |
| 6,981,464 B2 | * | 1/2006 | Birman et al. ......... | G01D 13/26 116/288 |
| 2002/0135995 A1 | * | 9/2002 | Fujita et al. ......... | G01D 13/265 362/23.2 |
| 2005/0162843 A1 | * | 7/2005 | Lee et al. ............. | G01D 13/265 362/23.2 |
| 2016/0076915 A1 | * | 3/2016 | Tamura ................. | B60K 35/00 362/23.16 |

FOREIGN PATENT DOCUMENTS

| | | | | |
|---|---|---|---|---|
| EP | 1233252 A1 | * | 8/2002 | ............. G01D 13/28 |
| EP | 2878932 A1 | * | 6/2015 | ........... G01D 13/265 |
| FR | 2687470 A1 | * | 8/1993 | ............. G01D 11/28 |
| FR | 2753790 A1 | * | 3/1998 | ............. G01D 11/28 |
| JP | 2004301643 A | * | 10/2004 | ............. G01D 11/28 |
| JP | 2005257293 A | * | 9/2005 | ............. G01D 11/28 |
| JP | 2010151489 A | * | 7/2010 | ............. G01D 11/28 |
| JP | 2011-027677 A | | 2/2011 | |
| JP | 5756648 B2 | * | 7/2015 | ............. B60K 35/00 |

\* cited by examiner

*Primary Examiner* — Richard A. Smith

(57) ABSTRACT

A pointer for an indicating device includes a conductor. The conductor includes a front portion, a rear portion, and a receiving portion. The rear portion extends from the front portion. The receiving portion extends from the rear portion. The receiving portion is configured to receive light and to conduct the light through the rear portion toward the front portion. The receiving portion has a cutout dented into the receiving portion.

10 Claims, 7 Drawing Sheets

COMPARATIVE EXAMPLE

INDICATING DEVICE AND POINTER FOR THE SAME

TECHNICAL FIELD

The present disclosure relates to an indicating device. The present disclosure relates to a pointer for the indicating device.

BACKGROUND

Conventionally, an indicating device such as a dial gauge includes a pointer movable to indicate information such as a speed of a vehicle. The indicating device may have a light source to illuminate the pointer. It may be desirable to distribute light conducted through the pointer to illuminate the pointer uniformly.

SUMMARY

The present disclosure addresses the above-described concerns.

According to an aspect of the preset disclosure, a pointer is for an indicating device. The pointer comprises a conductor including a front portion, a rear portion, and a receiving portion. The rear portion extends from the front portion. The receiving portion extends from the rear portion. The receiving portion is configured to receive light and to conduct light through the rear portion toward the front portion. The receiving portion has an cutout dented into the receiving portion.

According to another aspect of the preset disclosure, an indicating device comprises a dial plate. The indicating device further comprises a pointer rotatable on the dial plate. The indicating device further comprises a light source configured to emit light toward the pointer. The pointer includes a conductor including a receiving portion. The receiving portion is configured to receive light from light source to conduct light through the conductor. The receiving portion has an cutout dented into the receiving portion.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

As follows, an indicating device 1 will be described with reference to drawings. In drawing(s), "VERTICAL" may correspond to a vertical direction. "AXIAL" may correspond to an axial direction. "RADIAL" may correspond to a radial direction. "HORIZONTAL" may correspond to a horizontal direction. "LONGITUDINAL" may correspond to a longitudinal direction. "CIRCUMFERENTIAL" may correspond to a circumferential direction.

Figure 1:
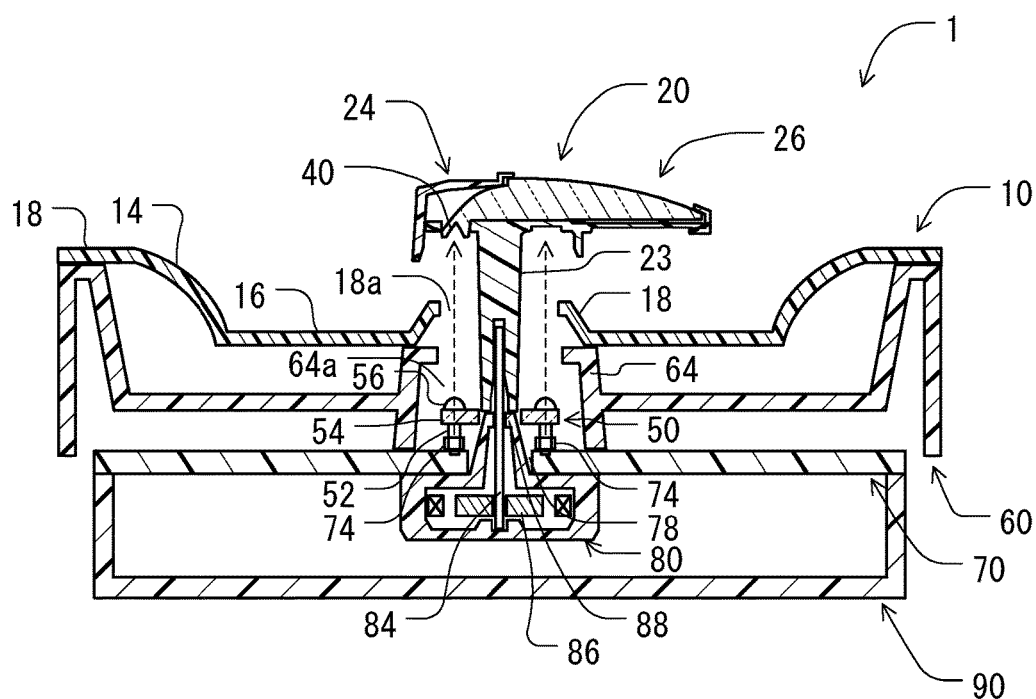
FIG. 1 is a sectional view showing an indicating device.
Figure 1:
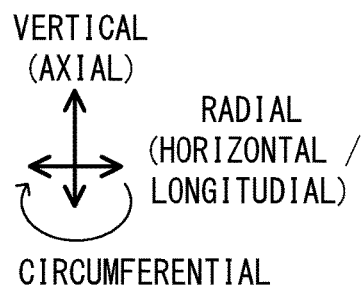

In FIG. 1, the indicating device 1 is, for example, a speedometer for an automobile. The indicating device 1 includes a pointer 20, a dial plate 10, a prism 50, a main housing 60, a printed circuit board (PCB) 70, a driver unit 80, and a rear housing 90.

The dial plate 10 has a display surface facing a viewer such as an occupant of an automobile. The dial plate 10 is in a circular shape when viewed from the viewer. The dial plate 10 has indication marks such as tick marks and numbers to form a gauge meter. The numbers may denote miles per hour (MPH). The dial plate 10 may be formed of resin such as polycarbonate. The dial plate 10 includes an outer portion 12, a curved portion 14, and a center portion 16. The outer portion 12 is projected relative to the center portion 16 toward the viewer. The curved portion 14 is located between the center portion 16 and the outer portion 12. The curved portion 14 has a cross section in a curbed shape. The center portion 16 includes a dial center 18 projected from the center portion 16 toward the viewer. The dial center 18 has a center hole 18a at its center.

The pointer 20 is inserted in the center hole 18a of the dial center 18. The pointer 20 is located adjacent to the display surface of the dial plate 10. The pointer 20 includes a pointer shaft 23, a pointer body 24, and an elongated portion 26. The elongated portion 26 is substantially at a right angle relative to the pointer shaft 23. The pointer body 24 and the elongated portion 26 are located above the dial center 18. The pointer shaft 23 extends through the center hole 18a of the dial center 18.

The PCB 70 is located between the main housing 60 and the rear housing 90. The PCB 70 has a center hole 78 at its center. The PCB 70 is equipped with electronic wirings and electronic devices such as a microprocessor. The PCB 70 is further equipped with light emitting diodes (LED) 74 around the center hole 78.

The driver unit 80 is equipped to the PCB 70. The driver unit 80 may be an electric motor such as a stepper motor. The driver unit 80 includes a drive shaft 84 and a motor portion 86. The drive shaft 84 is rotatably supported by a bottom bearing and a driver end 88 of the motor portion 86. The drive shaft 84 is coupled with a rotor of the motor portion 86. The motor portion 86 includes a stator configured to receive electricity from a controller (not shown) via the wiring of the PCB 70 to generate a magnetic field and to drive the drive shaft 84 via the rotor.

The drive shaft 84 and the driver end 88 are projected through the center hole 78 of the PCB 70. The drive shaft 84 is further coupled with the pointer shaft 23 of the pointer 20. The driver unit 80 is configured to manipulate the pointer 20 at an appropriate position to point the tick marks and the numbers on the dial plate 10.

The main housing 60 includes a housing center 64 defining a tubular hollow 64a. The prism 50 is located in the tubular hollow 64a of the housing center 64 and is supported by the PCB 70. The rear housing 90 is equipped to the PCB 70 to accommodate the driver unit 80.

Figure 2:
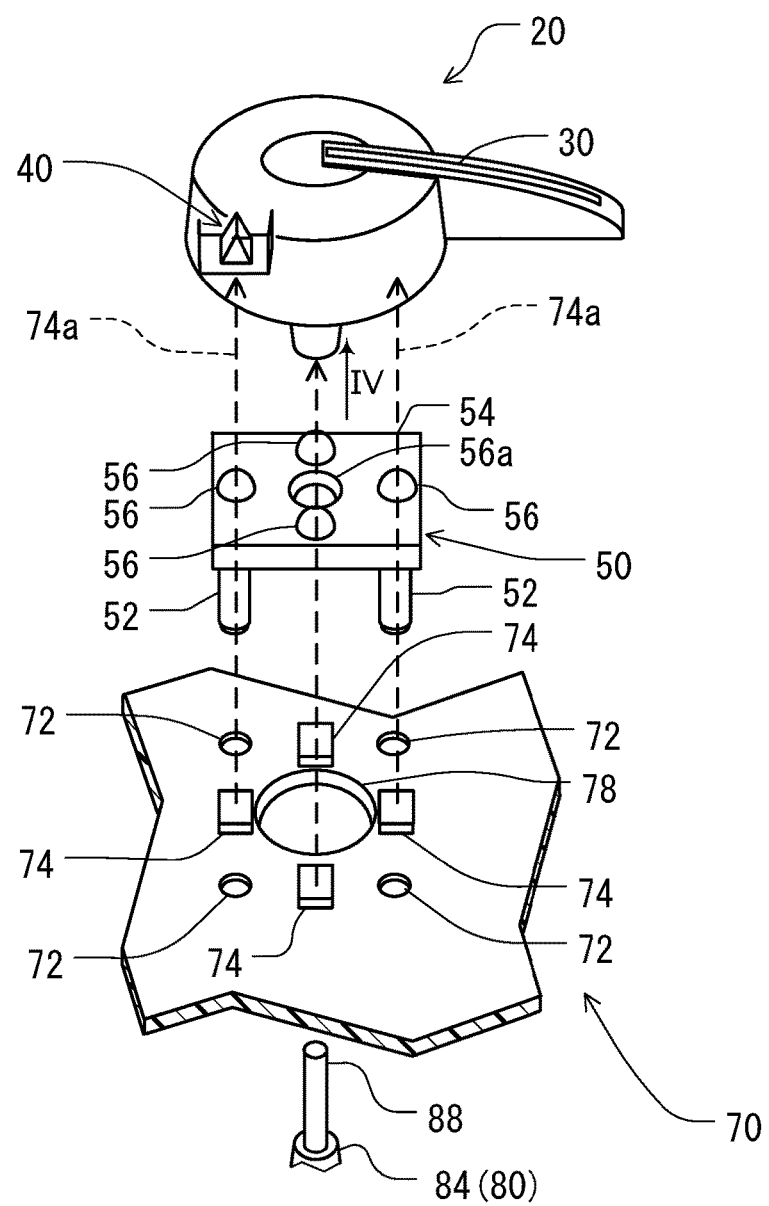
FIG. 2 is a perspective view showing components of the indicating device.

As shown in FIG. 2, according to the present example, the prism 50 includes a prism body 54 in a rectangular plate shape. The prism body 54 is integrally formed with four legs 52 and four lenses 56. The prism 50 is formed of a light-conductive material such as a translucent resin. The lenses 56 are faced to the pointer 20. The legs 52 are attached to support holes 72 formed in the PCB 70 to support the prism 50 on the PCB 70. The pointer shaft 23 and the drive shaft 84 of the driver unit 80 are coupled together to extend through a prism hole 56a of the prism 50 and the center hole 78 of the PCB 70.

The LEDs 74 are positioned on the PCB 70, such that optical axes of the lenses 56 of the prism 50 are aligned with optical axes of the LEDs 74, respectively. When each of the LEDs 74 is energized, the LED 74 emits light through the prism body 54 and the lens 56 toward the pointer 20. In this way, the light 74a illuminates the pointer 20. The lens 56 amplifies the light from the LED 74 and directs the light toward the pointer 20. In this way, the prism 50 rectifies the light from the LED 74.

Figure 3:
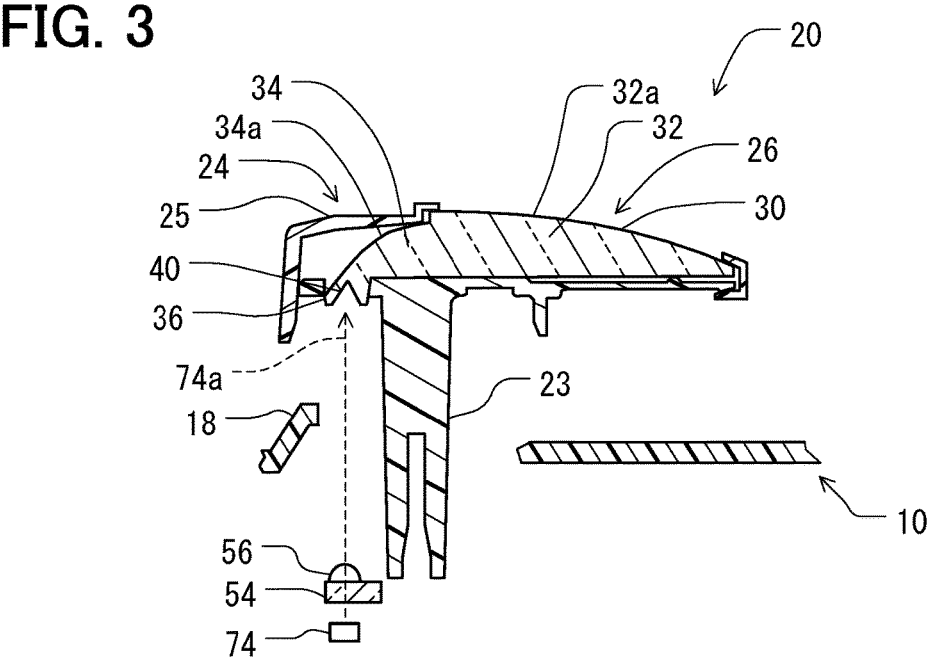
FIG. 3 is a sectional view showing a pointer of the indicating device.
Figure 4:
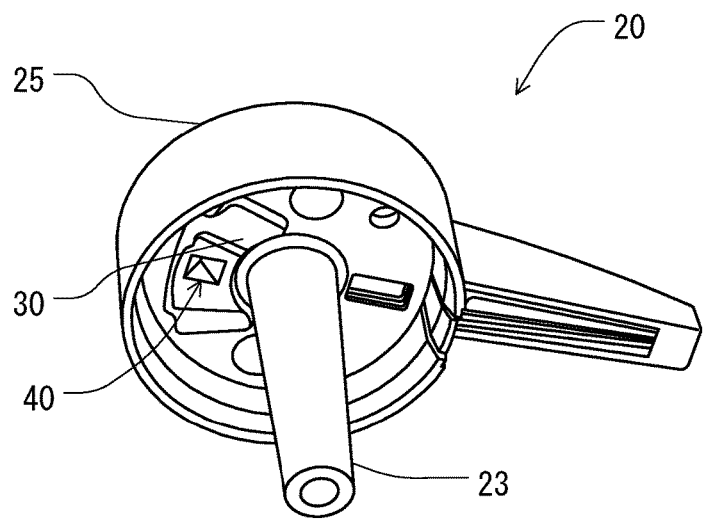
FIG. 4 is a perspective view showing the pointer when viewed along an arrow IV in FIG. 2.

As shown in FIGS. 3 and 4, the pointer 20 includes a cover 25 and a conductor 30. The cover 25 is formed of an opaque material such as resin. The conductor 30 is formed of a light-conductive material such as a translucent resin. The conductor 30 is coupled with the cover 25 and is partially enclosed with the cover 25. The cover 25 is integrally formed with the pointer shaft 23.

The conductor 30 has a front portion 32, a rear portion 34, and a receiving portion 36. The rear portion 34 is located between the front portion 32 and the receiving portion 36. The front portion 32 and the rear portion 34 extend linearly along the dial plate 10 in the horizontal direction. The receiving portion 36 is projected perpendicularly to the longitudinal direction. The receiving portion 36 extends from one end of the rear portion 34, which is on the opposite side of a tip end 29 of the front portion 32. The receiving portion 36 is bent substantially at a right angle relative to the front portion 32 and the rear portion 34. Thus, the conductor 30 is in an elongated L-shape when viewed from the lateral side of the conductor 30. The receiving portion 36 is directed in a direction along the axial direction of the pointer shaft 23. The receiving portion 36 is configured to be opposed to the LED 74 through the lens 56 and the prism body 54.

The front portion 32 has a front curved surface 32a. The front curved surface 32a is exposed from the cover 25 and is viewable from the viewer. The rear portion 34 has a rear curved surface 34a. The rear curved surface 34a is enclosed with the cover 25 and is not viewable from the viewer. The front curved surface 32a and the rear curved surface 34a are convex to an opposite side of the receiving portion 36. The receiving portion 36 has a cutout 40. The cutout 40 is a hollow space in a V-shape in the sectional view in FIG. 3.

Figure 5:
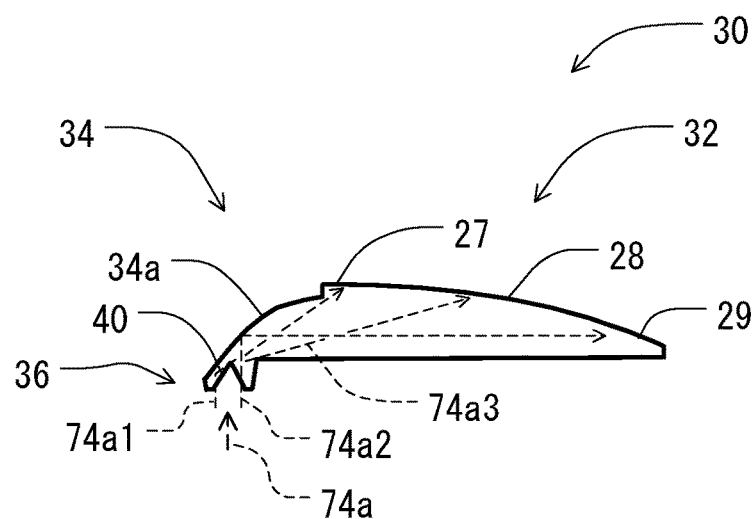
FIG. 5 is an explanatory view showing a conductor of the pointer according to a first embodiment.

As shown in FIG. 5, the light 74a emitted from the LED 74 includes multiple light fluxes 74a1 and 74a2. One light flux 74a1 passes through the receiving portion 36, and the one light flux 74a1 is partially reflected inside the rear curved surface 34a and is directed toward a root 27 of the front portion 32. The other light flux 74a2 passes through the receiving portion 36, and the other light flux 74a2 is partially reflected inside the rear curved surface 34a and is directed toward the tip end 29 of the front portion 32. The one light flux 74a1 and/or the other light flux 74a2 is also partially refracted and/or reflected on a surface of the cutout 40 and is directed toward a middle 28 of the front portion 32.

Figure 6:
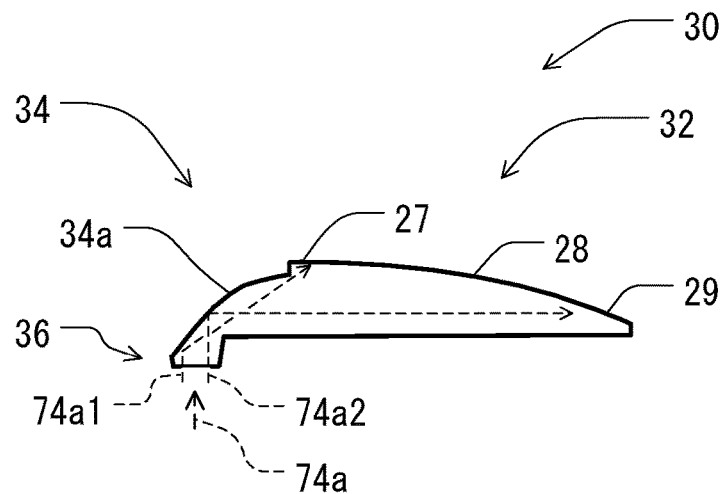
FIG. 6 is an explanatory view showing a conductor according to a comparative example.

FIG. 6 shows a comparative example of the conductor 30. The comparative example does not have the cutout 40 in the receiving portion 36. In the comparative example, One light flux 74a1 passes through the receiving portion 36, and the one light flux 74a1 is partially reflected inside the rear curved surface 34a and is directed toward the root 27 of the front portion 32. The other light flux 74a2 passes through the receiving portion 36, and The other light flux 74a2 is partially reflected inside the rear curved surface 34a and is directed toward the tip end 29 of the front portion 32. In the comparative example without the cutout 40, the one light flux 74a1 and/or the other light flux 74a2 may not be partially refracted and/or reflected in the receiving portion 36 and may not be directed toward the middle 28 of the front portion 32.

Figure 7:
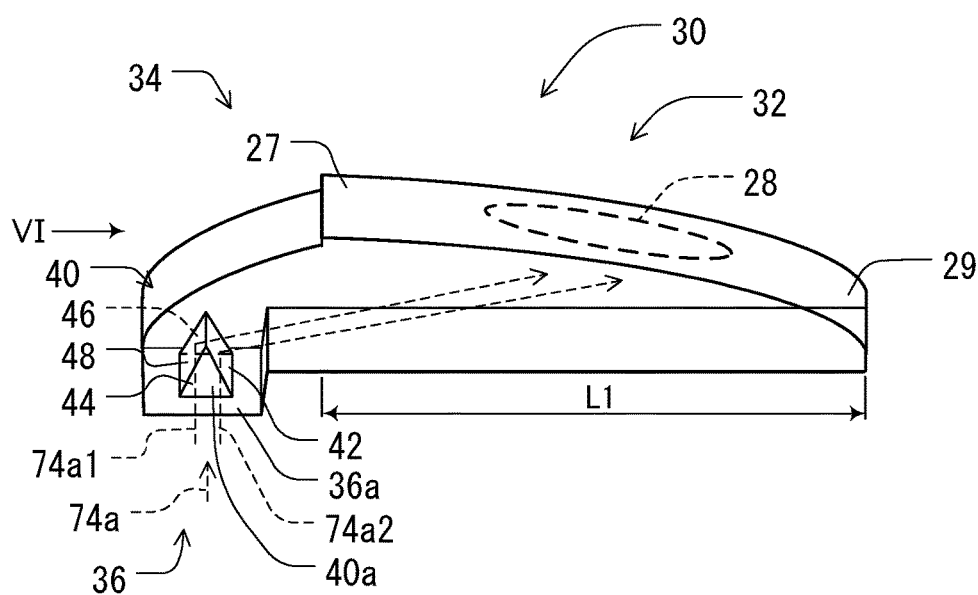
FIG. 7 is a perspective view showing the conductor according to the first embodiment.
Figure 8:
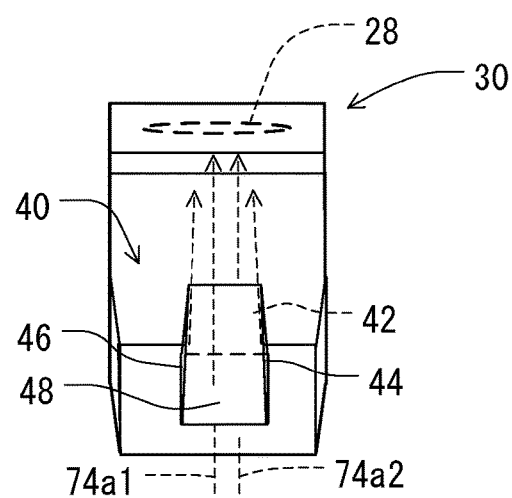
FIG. 8 is a rear view when viewed along an arrow VI in FIG. 7.

As shown in FIGS. 7 and 8, the receiving portion 36 has a receiving surface 36a substantially in a flat surface. The receiving surface 36a is configured to be perpendicular to an optical axis of the light 74a. The cutout 40 is dented from the receiving surface 36a into the receiving portion 36. The receiving surface 36a has an inlet 40a in a rectangular shape. The cutout 40 is a hollow space extending from the inlet 40a into the receiving portion 36. The cutout 40 reduces in cross section from the inlet 40a into the receiving portion 36.

The cutout 40 is defined by four surfaces including a front surface 42, a rear surface 48, and side surfaces 44 and 46. Each of the front surface 42 and the rear surface 48 is in a trapezoidal shape. Each of the side surfaces 44 and 46 is in a triangular shape. The front surface 42 is inclined relative to the vertical direction toward the opposite side of the front portion 32. The rear surface 48 is inclined relative to the vertical direction toward the front portion 32. The front surface 42 partially refracts (bends) the light flux 74a2 incident through the inlet 40a toward the middle 28 of the front portion 32. The rear surface 48 partially reflects the light flux 74a1 incident through the inlet 40a toward the middle 28 of the front portion 32.

As described above, the receiving portion 36 having the cutout 40 may enable to direct the light fluxes 74a2 and 74a1 toward the middle 28 of the front portion 32. Thus, the cutout 40 may enable to reduce blight spot such as the tip end 29 of the front portion 32 and to reduce dark spot such as the middle 28 of the front portion 32.

In FIG. 8, each of the side surfaces 44 and 46 is inclined inward relative to the vertical direction. The side surfaces 44 and 46 partially reflect the light fluxes incident through the inlet 40a inward in the width direction of the conductor 30. The side surfaces 44 and 46 being inclined may enable to converge the light fluxes into the center of the conductor 30.

Figure 9:
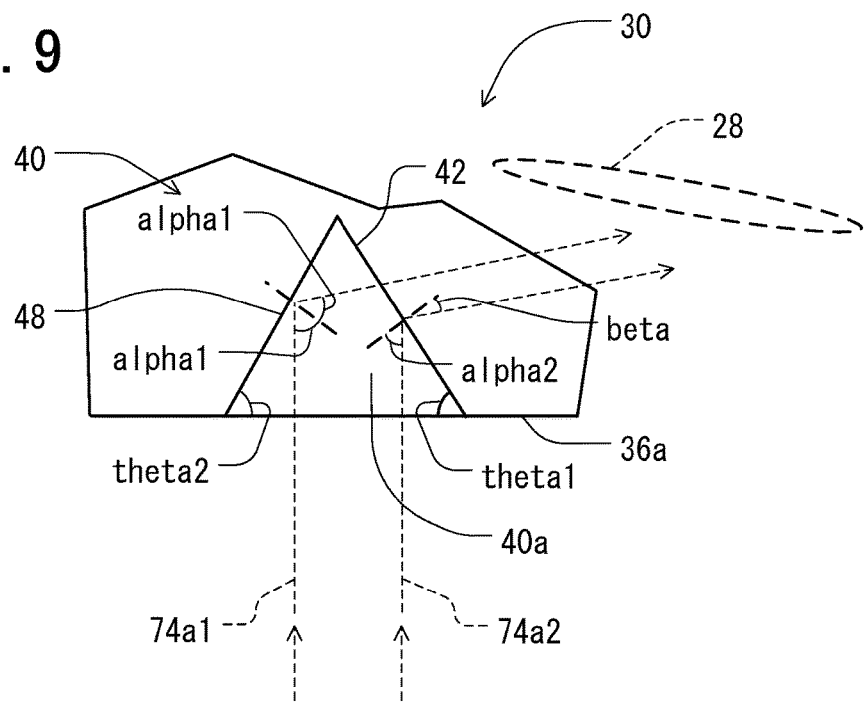
FIG. 9 is an explanatory view showing a cutout of the conductor according to the first embodiment.

FIG. 9 shows one example of the receiving portion 36. According to the present example, the cutout 40 has a cross section in an isosceles triangle. The front surface 42 is inclined at an angle theta1 relative to the receiving surface 36a. The front surface 42 is inclined at an angle theta2 relative to the receiving surface 36a. In the present example, the angle theta1 may be the same as the angle theta2. The light flux 74a1 is at an incident angle alpha1 relative to a normal line of the rear surface 48 and is partially reflected on the rear surface 48 at a reflection angle alpha1 relative to the normal line of the rear surface 48. In this case, the incident angle alpha1 may be the same as the reflection angle alpha1.

The light flux 74a2 is at an incident angle alpha2 relative to a normal line of the front surface 42 and is partially refracted on the front surface 42 at an output angle beta relative to the normal line of the front surface 42. The light flux is refracted and is directed toward the middle 28 of the conductor 30. The output angle beta may depend on an optical property of a material of the conductor 30. The angles theta1 and theta2 may be determined to direct the light fluxes 74a1 and 74a2 toward the middle 28 of the conductor 30 as a target.

Second Embodiment

Figure 10:
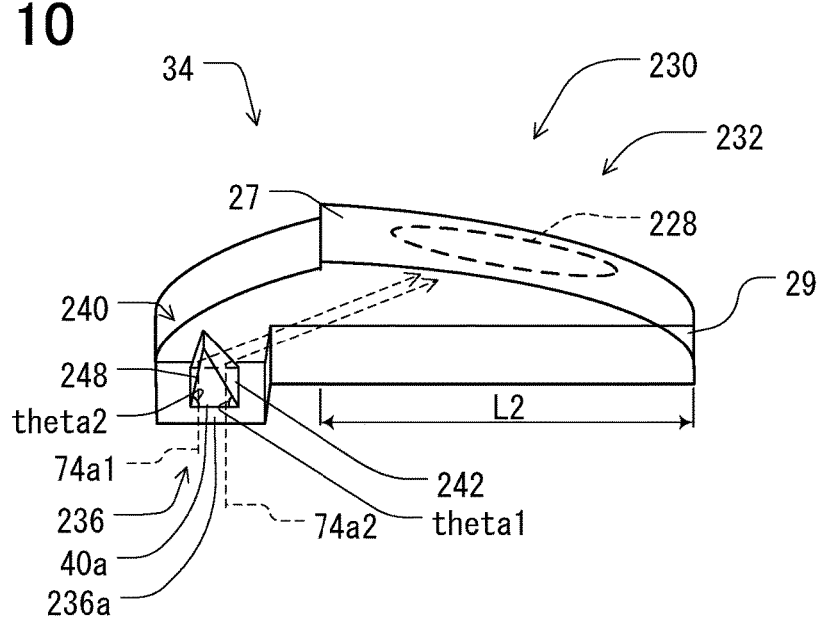
FIG. 10 is a perspective view showing a conductor according to a second embodiment.

As shown in FIG. 10, a conductor 230 according to the present embodiment has a front portion 232 having a length L2. The length L2 is less than a length L1 of the front portion 32 of the conductor 30 according to the first embodiment (FIG. 7). In this case, a middle 228 of the front portion 232, i.e., the target, may be closer to a receiving portion 236. In the present embodiment, a cutout 240 may have a front surface 242 and a rear surface 248 at different angles from those in the first embodiment, respectively. Specifically, the angle theta1 may be decreased to lay the front surface 242 toward a receiving surface 236a. In this case, the light flux 74a2 refracted on the front surface 242 may be directed closer to the receiving portion 236. In addition, the angle theta2 may be increased to tilt the rear surface 248 from the receiving surface 236a. In this case, the light flux 74a1 reflected on the rear surface 248 may be also directed closer to the receiving portion 236. In the present example, the angle theta1 is less than the angle theta2. In this way, the angles theta1 and theta2 may be adjusted to adapt to the front portion 232 having the smaller length L2.

Alternatively, in a case where the conductor has a larger length, the angle theta1 may be set to be greater than the angle theta2 to direct the light flux refracted on the front surface and the light flux reflected on the rear surface farther from the receiving portion.

Third Embodiment

Figure 11:
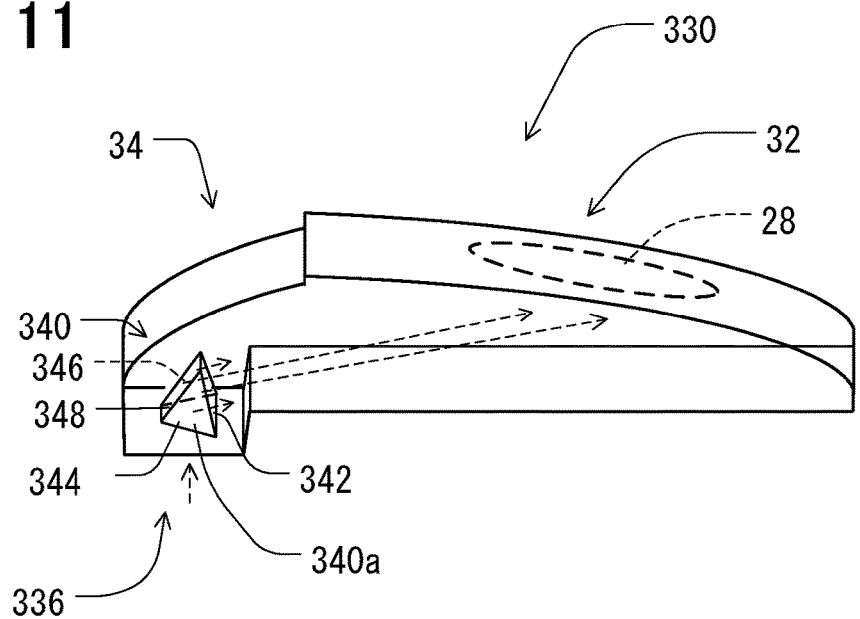
FIG. 11 is a perspective view showing a conductor according to a third embodiment.

As shown in FIG. 11, a conductor 330 includes a receiving portion 336. The receiving portion 336 according to the present embodiment has a cutout 340 having an inlet 340a in a trapezoidal shape. The inlet 340a is increased in width toward the front portion 32. The cutout 340 is defined by a front surface 342, a rear surface 348, and side surfaces 344 and 346. The side surfaces 344 and 346 are inclined relative to the longitudinal direction of the conductor 330. According to the present example, in addition to the rear surface 348, the side surfaces 344 and 346 may also reflect light fluxes toward the middle 28 of the front portion 32.

Fourth Embodiment

Figure 12:
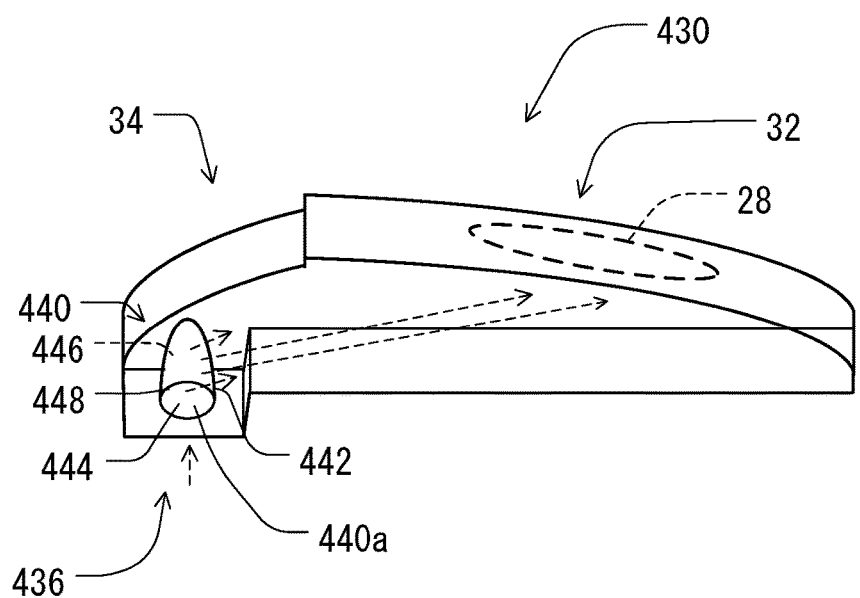
FIG. 12 is a perspective view showing a conductor according to a fourth embodiment.

As shown in FIG. 12, a conductor 430 includes a receiving portion 436. The receiving portion 436 according to the present embodiment has a cutout 440 having an inlet 440a in a circular shape. The cutout 440 reduces in cross section from a receiving surface 436a into the receiving portion 436. The cutout 440 is defined by a front surface 442, a rear surface 448, and side surfaces 444 and 446, which are continual curved surfaces. The rear surface 448 is inclined on the rear side toward the front portion 32. The front surface 442 is inclined on the front side toward the opposite side of the front portion 32. According to the present example, the cutout 440 may enable to direct the light flux toward a target such as the middle 28 of the front portion 32. The inlet may be in an oval shape.

Other Embodiments

The cutout may employ various shapes and dimensional features. The angles of the front surface and the rear surface according to the above-described embodiments are examples. The angles of the front surface and the rear surface may be selected from various angles, in consideration of relative positions among the target, such as the middle of the front portion, and the receiving portion. In the first and second embodiments, each of the front surface and the rear surface may be in a rectangular shape, and each of the side surfaces may be in a trapezoidal shape. Each of the front surface and the rear surface may be in a triangular shape to define a cutout in a pyramid-shape with the side surfaces each being in a triangular shape. The receiving portion may have multiple cutouts.

The cutout may be filled with a light-conductive material, which is different in light conductivity from the receiving portion. That is, the cutout is not limited to a hollow space.

The indicating device 1 may be used in various control panels or instrument panels other than a speedometer. The prism 50 may be omitted.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A pointer for an indicating device, the pointer comprising:
    a conductor including a front portion, a rear portion, and a receiving portion, wherein
    the rear portion extends from the front portion,
    the receiving portion extends from the rear portion,
    the receiving portion is configured to receive light and to conduct light through the rear portion toward the front portion, and
    the receiving portion has an cutout dented into the receiving portion, wherein
    the receiving portion has a receiving surface to receive light,
    the receiving portion has at least one surface defining the cutout,
    the at least one surface is inclined relative to the receiving surface,
    the at least one surface includes a rear surface,
    the rear surface is inclined toward the front portion,
    the rear surface is configured to reflect light toward the front portion,
    the at least one surface further includes a front surface,
    the front surface is inclined to an opposite side of the front portion, and the front surface is configured to refract light toward the front portion.

2. The pointer according to claim 1, wherein
the receiving portion further has side surfaces defining the cutout,
the side surfaces are located on both sides of the front surface and the rear surface, and
each of the side surfaces is in a triangular shape.

3. The pointer according to claim 2, wherein
the front surface, the rear surface, and the side surfaces define an inlet from which the cutout extends into the receiving portion, and
the inlet is in a rectangular shape.

4. The pointer according to claim 1, wherein
the rear portion extends from the front portion linearly in a longitudinal direction, and
the receiving portion extends perpendicularly to the longitudinal direction.

5. The pointer according to claim 1, wherein
the front portion includes a tip end, a middle, and a root,
the middle is located between the tip end and the root, and
the cutout is configured to direct light selectively to the middle of the front portion.

6. The pointer according to claim 1, wherein
the receiving surface is a flat surface,
the rear portion extends from the front portion linearly in a longitudinal direction, and
the receiving surface is substantially in parallel with the longitudinal direction.

7. The pointer according to claim 1, wherein
the receiving surface is perpendicular to an optical axis of light.

8. The pointer according to claim 1, wherein
the front portion has a front curved surface,
the rear portion has a rear curved surface,
the front curved surface and the rear curved surface are convex to an opposite side of the receiving portion,
the rear curved surface is configured to reflect light,
the front curved surface is configured to receive light reflected on the rear curved surface and to illuminate the front curved surface, and
the front curved surface is configured to receive light from the cutout and to illuminate the front curved surface.

9. The pointer according to claim 1, further comprising:
a cover being opaque and partially enclosing the conductor, wherein
the cover has a portion opposed to the cutout.

10. An indicating device comprising:
a dial plate;
a pointer rotatable on the dial plate; and
a light source configured to emit light toward the pointer, wherein
the pointer includes a conductor including a receiving portion,
the receiving portion is configured to receive light from light source to conduct light through the conductor, and
the receiving portion has an cutout dented into the receiving portion, wherein
the indicating device further comprises a prism located between the light source and the receiving portion, wherein
the prism is configured to conduct light from the light source to the receiving portion and to rectify light therethrough.

* * * * *